Figure 1:
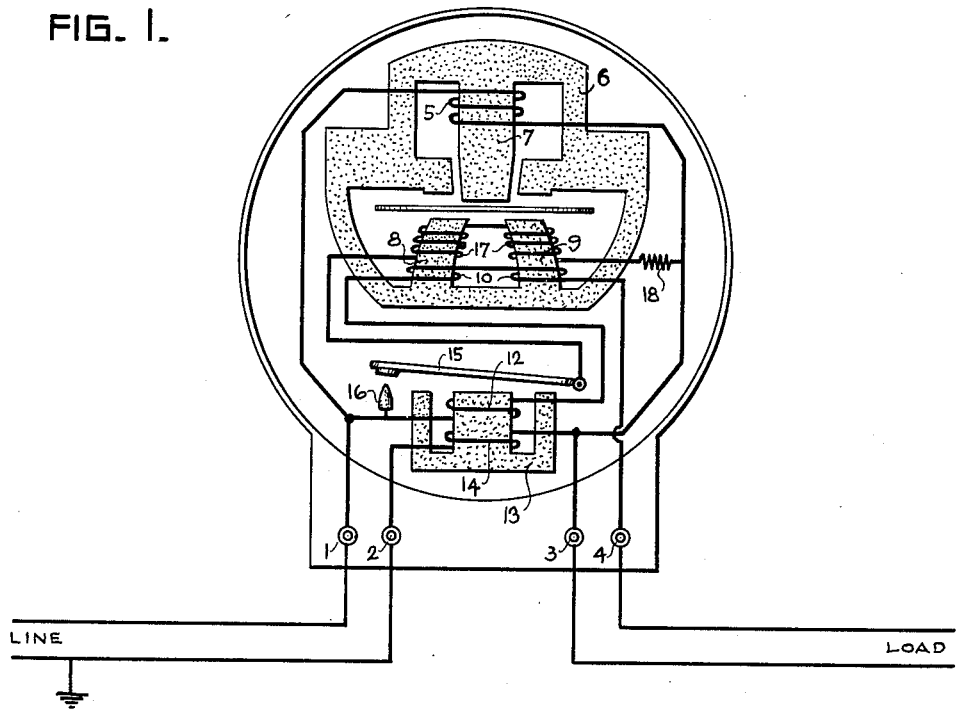

March 27, 1951  C. L. JAUSS  2,546,693

ANTITAMPERING ELECTRIC METER

Filed July 9, 1947

INVENTOR.
Carlos L. Jauss
BY
S. Stephen Baker
ATTORNEY.

Patented Mar. 27, 1951

2,546,693

UNITED STATES PATENT OFFICE 2,546,693

ANTITAMPERING ELECTRIC METER

Carlos L. Jauss, New York, N. Y.

Application July 9, 1947, Serial No. 759,743

5 Claims. (Cl. 171—34)

This invention relates to an electric meter for measuring alternating current.

Conventional meters can be circumvented in several ways. The most common way to do this is to place a shunt across the load coil of the meter. Another method is to feed an opposite phase current across the meter terminals to which the load coil is connected so as to balance out the current in the load coil. In a polyphase system, opening the circuit of one phase will cause the meters to under-read the current drawn since the load then generally has a low power factor.

It is an object of my invention to provide an electric watt-hour meter which will continue to record despite tampering according to the above methods and further without altering the principal structure of conventional meters.

It is another object of my invention to provide an electric meter having an internal structure which causes it to read the proper or a higher amount of power under various tampering conditions.

It is a further object of my invention to provide a meter which can be used for polyphase systems and if one phase is disabled and large currents of low power factor are drawn then the meters in the other phase record at a higher than normal rate.

Figure 2:
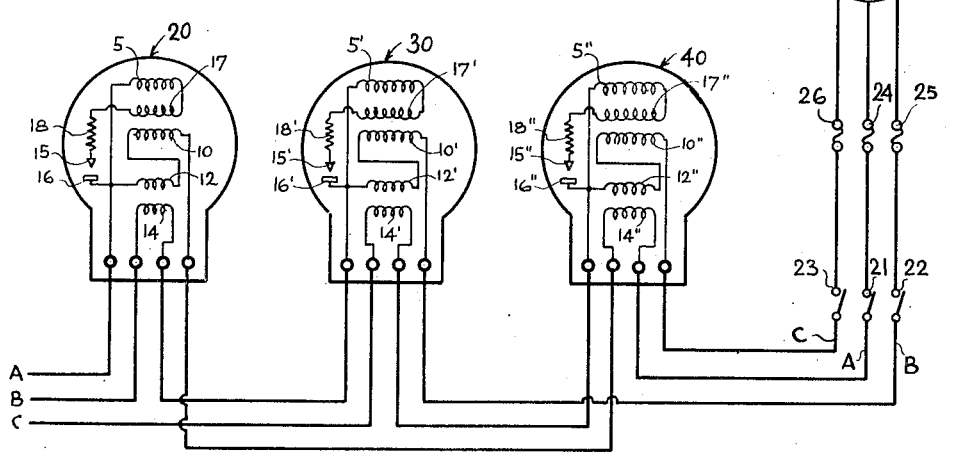

The invention will be fully understood from the following description and the drawing, in which:

Fig. 1 is a wiring diagram of an electric meter according to my invention connected in a single phase line, and Fig. 2 is a wiring diagram of a three phase electric metering system embodying my invention.

Referring to the drawing, Fig. 1, there is shown a meter having terminals 1 and 2 connected to the incoming power line and terminals 3 and 4 connected to the load line. Between terminals 1 and 3 is connected the voltage coil 5. This coil is conventional in the most widely used present day watt-hour meters. The coil 5 is wound on a pole 7 of a core 6. The load coil 10 is wound on the poles 8 and 9 of core 6 and is connected between terminals 1 and 4. The usual rotating induction disk 11 is shown between the pole 7 and poles 8 and 9. The detailed structure of these elements is not shown, being well known in the art.

A coil or winding 12 is connected in series with the load coil 10. Coil 12 forms one winding of a relay 13. The other winding 14 of the relay 13 is connected between terminals 2 and 3. The winding 14 is therefore in the return current line.

The relay 13 is provided with an armature 15 carrying a movable contact adapted to close against a fixed contact 16 upon closing of the relaly 13. An auxiliary coil 17 and resistor 18 are connected between the armature 15 and terminal 3.

The operation of the meter is as follows. Under normal conditions, i. e., when no tampering with the meter has occurred, coils 5 and 10 are energized and the meter operates in the conventional manner. Armature 15 is open, because the currents in coils 12 and 14 produce oppositely poled magnetic fields which cancel each other sufficiently to prevent operation of the relay. Coil 17 is, therefore, not energized. Any connection to the terminals 1 and 4 designed to prevent the flow of current in coil 10 will also prevent the flow of current in coil 12. Deenergizing coil 12 enables coil 14 to operate the relay. This causes coil 17 to be connected to contact 16 and terminal 1. Coil 17 will then be energized and will supply the magnetic flux formerly created by coil 10. Coil 17 and resistor 18 may be selected so as to supply a greater flux than would normally be produced by coil 10. In this manner the theft of electric current is prevented.

Referring now to Fig. 2 there is shown an embodiment of my invention in a three phase power system. Each of the three meters is the same as the meter shown in Fig. 1 and, therefore, for the sake of simplicity, the showing of some of the details of the meters is not duplicated in Fig. 2. For these details of the meters reference will be made to Fig. 1.

The three phase line is shown as consisting of the three wires A, B, and C. The three wires may be connected through switches 21, 22, and 23 and fuses 24, 25 and 26 to a load 27, which may be an induction motor. The current in line A passes through relay winding 12 and load coil 10 of meter 20 and through relay winding 14″ of meter 40. Similarly, the current in line B passes through relay winding 14 of meter 20 and winding 12′ and coil 10′ of meter 30. The current in line C passes through windings 14′, 12″ and coil 10″.

In a conventional metering system for three phase current using a meter for each phase, or a single meter equivalent to three single-phase meters, the energy chargeable to the customer is given by the algebraic sum of the three meter readings. If the three phase load is a three phase induction motor, one of the phase lines may be opened by removing fuse 25. The motor can then be energized by the other two lines, C and A. However, the current supplied to the motor will then have a very low power factor, resulting in low meter readings.

If one of the lines, say B, is opened in Fig. 2, the operation of my metering system is as follows: Relay coil 14 of meter 20 and relay coil 12' of meter 30, which are in line B, are de-energized. A large reactive current flows through coil 12 of meter 20 and coil 14' of meter 30. This causes the relays in meters 20 and 30 to close consequently coils 17 and 17' are energized and meters 20 and 30 run at a high speed. Meter 40, however, remains in normal condition because the currents in coils 12" and 14" are substantially equal and opposite.

It will be observed in the embodiment of Fig. 2 that the relay coils are not in the power and return circuits respectively, the return circuit being a ground common to the three phase lines as is well understood in the art. Accordingly, the coils in each relay are wound in opposite directions in order to jointly produce the neutralizing flux for the relay armature. The voltage coils as well as the auxiliary load coils are illustrated as being grounded in the embodiment of Fig. 2. This arrangement permits a conventional 110 volt meter to operate over a 220 volt line which is usually used in three-phase circuits.

It can be seen that I have provided an electric meter which cannot be prevented from registering by any of the commonly employed methods of tampering with meters, but on the contrary will register or run at full speed when tampered with. The meter of my invention requires no external appliances and does not have an appearance distinguishing it from an ordinary meter although the usual bridge across terminals 2 and 3 is omitted in adapting the meter to the instant invention. The auxiliary coil 17 is further disposed so as to require no additional mounting means since it is wound around the poles 8 and 9 together with the conventional coil. Load coil 17, it will be observed, effectively operates across the line so that apart from the voltage drop of resistor 18, the full voltage runs through it and it may be made considerably smaller and of far finer wire than the normal load coil in providing the same or more flux. In the principal embodiment of the invention the provision of coils 12 and 14, both wound in the same direction and one in series with the normal load coil while the other is in the return circuit, effectively balances the load coil current against the load line current. If there is a difference between these currents, such as will be produced by the use of a tampering device, the auxiliary coil is automatically introduced into the circuit. When the tampering device is removed, the meter returns to normal operation and does not require internal adjustment. In the embodiment as used for three-phase operation, the currents in the respective phases are substantially equal when operating normally so that the pair of relay coils is effective in neutralizing the relay action in the absence of tampering.

While I have described the essential construction and operation of only one meter embodying the principles of my invention, it is obvious that various changes in form and details may be resorted to without departing from the spirit of my invention.

Having thus described the invention, what I claim is:

1. In an anti-tampering watt-hour meter adapted to be connected to a power line and a load line and having an induction disc, a voltage coil, and a load coil on a magnetic core, an auxiliary coil, a relay having an armature and a winding, said auxiliary coil being connected to the armature and included in an open electrical circuit during normal operation of the meter so as to be normally unenergized and being mounted on said magnetic core so as to act upon said induction disc when energized, an energizing means for said auxiliary coil and operative upon a sub-normal passage of current through said load coil, said auxiliary coil energizing means comprising a normally balanced electrical circuit wherein two currents flow in opposing directions so as to produce substantially no flux, said normally balanced electrical circuit including the relay winding and the relay controlled thereby, said relay winding being energized when said normally balanced electrical circuit becomes unbalanced so as to produce a resultant flux and operate said relay, and circuit connection means controlled by said relay when operated for energizing said auxiliary coil so as to produce a flux acting upon said induction disc.

2. In an anti-tampering, watt-hour meter adapted to be connected to a power line and a load line and having a voltage coil and a load coil on a magnetic core, the load coil being connected in series with one side of the power line and one side of the load line, and the voltage coil being connected across the load line; a pair of normally open contacts, an auxiliary coil on said magnetic core, one end of said auxiliary coil being connected to one of said normally open contacts, said auxiliary coil being electrically connected through both of said contacts across the power line upon closure of said contacts, and a relay having a pair of windings respectively connected into both sides of the power line so as to produce equal opposing magnetomotive forces pursuant to currents flowing through said power line to render the relay inoperative, one of said contacts being the armature of said relay and being operated to close the contacts when the magnetomotive forces of the respective relay windings are unbalanced, the currents in said winding being unbalanced when a predetermined difference between the current in the load coil and the load line occurs.

3. In an anti-tampering, watt-hour meter adapted to be connected to a power line and a load line and having a voltage coil and a load coil on a magnetic core, the load coil being connected in series with one side of the power line and one side of the load line, and the voltage coil being connected across the load line; a relay having two windings, one of said windings being in series with the load coil and the other winding being in series between the other side of the power line and the load line, said windings being arranged to produce opposing magnetomotive forces, a pair of normally open contacts adapted to be closed by said relay, an auxiliary coil on said magnetic core, one end of said auxiliary coil being connected to one of said normally open contacts, said auxiliary coil being electrically connected through both of said contacts across the power line upon the closure of said contacts when shunting of the load coil externally of the meter occurs.

4. In an anti-tampering, watt-hour meter adapted to be connected to a power line and a load line and having an induction disc, a voltage coil, and a load coil on a magnetic core, a relay, an auxiliary coil having one side connected through the armature of said relay, said auxiliary coil being unenergized during normal operation of the meter and being disposed so as to act upon said induction disc when energized, and means to energize said auxiliary coil when the current in the load coil is less than the current in the load line, said auxiliary coil energizing means comprising the relay, the armature of which is operative to connect said auxiliary coil into a closed electrical circuit so as to energize it when the relay is operated, a pair of energizing coils in said relay, each of said energizing relay coils being wound in the same direction and being respectively disposed in series with the load coil and in the return circuit of the load line whereby equal and opposite currents run through said energizing relay coils when the load current is equal to the line current so as to maintain the relay inoperative, said equal and opposite currents serving to neutralize any flux produced by the energizing relay coils so as to render said auxiliary coil energizing means inoperative.

5. A device according to claim 4 and wherein said auxiliary coil is mounted on the same magnetic core as said load coil and circuit connection means controlled through the operation of said relay for interposing said auxiliary coil across the power line.

CARLOS L. JAUSS.

REFERENCES CITED

The following references are of record in the file of this patent:

UNITED STATES PATENTS

| Number | Name | Date |
|---|---|---|
| 750,948 | Cox | Feb. 2, 1904 |
| 963,096 | Troy | July 10, 1910 |
| 2,052,733 | Wagner et al. | Sept. 1, 1936 |

FOREIGN PATENTS

| Number | Country | Date |
|---|---|---|
| 423,967 | Great Britain | Feb. 12, 1935 |